United States Patent [19]

Kelsey

[11] Patent Number: 4,774,311

[45] Date of Patent: Sep. 27, 1988

[54] PREPARATION OF POLY(ARYL ETHER KETONES) IN THE PRESENCE OF AN ALKALI, ALKALINE EARTH OF LANTHANIDE METAL SALT

[75] Inventor: Donald R. Kelsey, Hillsborough, N.J.

[73] Assignee: Amoco Corporation, Chicago, Ill.

[21] Appl. No.: 898,490

[22] Filed: Aug. 21, 1986

Related U.S. Application Data

[63] Continuation-in-part of Ser. No. 767,337, Aug. 21, 1985, abandoned.

[51] Int. Cl.⁴ .................................................. C08G 8/02
[52] U.S. Cl. ................................... 528/125; 528/126; 528/128; 528/219
[58] Field of Search ................ 528/125, 126, 128, 219

[56] References Cited

U.S. PATENT DOCUMENTS

| | | | |
|---|---|---|---|
| 3,941,748 | 3/1976 | King | 260/47 R |
| 4,169,178 | 9/1979 | Freeman | 528/126 |
| 4,176,222 | 11/1979 | Cinderen et al. | 528/126 |
| 4,320,224 | 3/1982 | Rose et al. | 528/125 |

Primary Examiner—John Kight
Assistant Examiner—M. L. Moore
Attorney, Agent, or Firm—Donald M. Papuga; William H. Magidson; Ralph C. Medhurst

[57] ABSTRACT

Described herein is an improved process for preparing poly(aryl ether ketones) by a nucleophilic displacement polycondensation reaction wherein the improvement comprises adding an alkali, alkaline earth, or lanthanide metal salt to the polycondensation reaction.

14 Claims, No Drawings

PREPARATION OF POLY(ARYL ETHER KETONES) IN THE PRESENCE OF AN ALKALI, ALKALINE EARTH OF LANTHANIDE METAL SALT

RELATED APPLICATION

This application is a continuation-in-part application of Ser. No. 767,337, filed Aug. 21, 1985, now abandoned.

FIELD OF THE INVENTION

This invention is directed to an improved process for preparing poly(aryl ether ketones) by a nucleophilic displacement polycondensation reaction wherein the improvement comprises adding an alkali, alkaline earth, or lanthanide metal salt to the polycondensation reaction.

BACKGROUND OF THE INVENTION

Over the years, there has been developed a substantial body of patent and other literature directed to the formation and properties of poly(aryl ethers) (hereinafter called "PAE"). A broad range of PAE's was achieved by Johnson et al., Journal of Polymer Science, A-1, vol. 5, 1967, pp. 2415–2427, Johnson et al., U.S. Pat. Nos. 4,108,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. Nos. 3,953,400; Dahl et al., 3,956,240; Dahl, 4,247,682; Rose et al., 4,320,224; Maresca, 4,339,568; Attwood et al., Polymer, 1981, vol. 22, August, pp. 1096–1103; Blundell et al., Polymer, 1983 vol. 24, August, pp. 953–958, Attwood et al., Polymer Preprints, 20, no. 1, April 1979, pp. 191–194; and Rueda et al., Polymer Communications, 1983, vol. 24, September, pp. 258–260. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the phenylene units in the structure are assumed.

Thus PAEKs are well known; they can be synthesized from a variety of starting materials; and they can be made with different melting temperatures and molecular weights. Most of the PAEKs are crystalline and at sufficiently high molecular weights they are tough, i.e., they exhibit high values (150 ft-lbs/in$^3$) in the tensile impact test (ASTM D-1822). Thy have potential for a wide variety of uses, and their favorable properties class them with the best of the engineering polymers.

Some PAEK's may be produced by the Friedel-Crafts catalyzed reaction of aromatic diacylhalides with unsubstituted aromatic compounds such as diphenyl ether as described in, for example, U.S. Pat. No. 3,065,204. These processes are generally inexpensive processes; however, the polymers produced by these processes tend to be brittle and thermally unstable. In contrast PAEK's made by nucleophilic aromatic substitution reactions are tough crystalline polymers. Nucleophilic aromatic substitution reactions for producing PAEK s are described in the following references:

Canadian Pat. No. 847963 describes a process for preparing polyarylene polyethers. The process comprises contacting equimolar amounts of a dihydric phenol and a dihalobenzenoid compound and at least one mole of an alkali metal carbonate per mole of dihydric phenol. The dihydric phenol is in situ reacted with the alkali metal carbonate to form the alkali metal salt thereof and the formed salt reacts with the dihalobenzenoid compound to form the polyarylene polyether in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic numbe than that of sodium. The second alkali metal carbonate or bicarbonate is used in amounts such that there are 0.001 to 0.2 gram atoms of the alkali of higher atomic number per gram atom of sodium. The process is stated to take place faster when the combination of sodium carbonate or bicarbonate and the second alkali metal carbonate or bicarbonate are used. Also the products are stated to be of high molecular weight using such a combination.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) be at least twice the number of phenol (—OH) groups. The examples show it to be, in general, a slow process.

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen containing reactants. The patent states that the process gives faster reactions and higher molecular weights and less colored polymers than a process using potassium fluoride in place of potassium carbonate.

U.S. patent application Ser. No. 713,845 filed in the name of D. R. Kelsey on Mar. 20, 1985 titled An Improved Process For Preparing Poly(Aryl Ether Ketones), and assigned to the same assignee as this application, described an improved process for preparing poly(aryl ether ketone)s by the reaction of a mixture of at least one bisphenol and at least one dihalobenzenoid compound, or of a halophenol, in which the improvement involves providing to the reaction a combination of sodium carbonate and/or bicarbonate and an alkali metal halide selected from potassium, rubidium or cesium fluoride or chloride, or combinations thereof.

Poly(aryl ethers) prepared by nucleophilic displacement polycondensation may contain both phenate and halo aromatic end groups, e.g.,

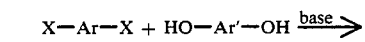

-continued

Polymer O—Ar'—O⁻ M⁺ and/or Polymer Ar—X ence of potassium fluoride, which they depicted as the following:

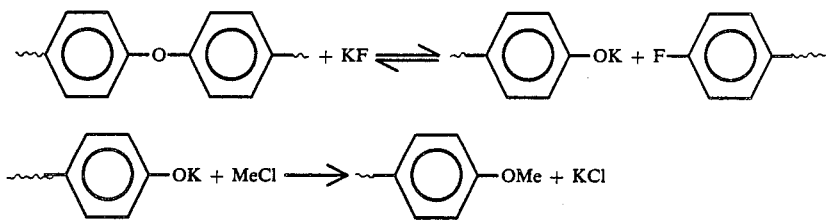

wherein X is a displaceable group such as halogen or nitro, M is the cation of the base used (e.g., Na⁺, K⁺, etc.) and Ar (Ar') is an aromatic species. In the prior art, it has been customary to add a terminating agent, also referred to as an end-capping agent or end-stopper, at the end of the polymerization to react with the phenate end groups, e.g.,

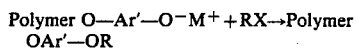

For example, U.S. Pat. No. 4,108,837 illustrates in Examples the use of methyl chloride as a terminating agent; U.S. Pat. No. 4,169,178 illustrates the use of dichlorodiphenylsulfone; and U.S. Pat. No. 4,320,224 illustrates the use of 4,4'-difluorobenzophenone as terminating agents.

The use of an end capping reagent can be useful for controlling the molecular weight of the polymer. However, more importantly, the presence of phenate or phenolic end groups in the polymer can lead to thermal instability. Converting these end groups to ether groups by use of an end capping reagent results in generally improved thermal stability.

To assure that end capping is complete, an excess of end-capping reagent would be desirable, once the desired polymer molecular weight has been achieved, to assure that all of the residual phenate groups can react with the terminating reagent.

However, use of excess capping reagent can often lead to a significant decrease in molecular weight. This is known in the art; for example, U.S. Pat. No. 4,169,178 discloses that "end stopping may lead to some reduction in the polymer molecular weight." This patent illustrates in Examples 4, 6, and 7, for example, reductions in reduced viscosity of 0.11 to 0.29 within 5 to 10 minutes at 320° C.-330° C. after addition of a small amount of dichlorodiphenyl sulfone as the end-capping reagent.

This phenomenon has been confirmed in this application in Example E, which shows that addition of only 2 mole % of a difluorodiketone, i.e., 1,4-bis(4-fluorobenzoyl)benzene as end-capping agent results in a decrease in molecular weight from a reduced viscosity of 1.37 dl/gm to a reduced viscosity of 0.98 dl/gm within 1 hour at a temperature of 300° C.

Attwood, et al. [Polymer, 18, 359 (1977)], have discussed the problem of terminating polysulfones prepared from fluorophenyl-sulphonyl phenoxides with methyl chloride due to depolymerization in the presence of potassium fluoride, which they depicted as the following:

They suggested two methods to control the depolymerization during polymer termination: (1) cool the reaction to "freeze" the equilibration by potassium fluoride before termination, or (2) polymerize beyond the desired molecular weight, isolate the polymer, and then degrade the polymer in dimethyl sulfoxide with sodium methoxide to the desired molecular weight and terminate with methylene chloride.

Neither of these methods can be effective for crystalline poly(aryl ethers), especially poly(aryl ether ketones), since cooling the reaction mixture in such cases would lead to crystallization of the polymer and an intractable reaction mixture and these polymers. are generally insoluble in solvents such as dimethyl sulfoxide. Furthermore, the second method given by Attwood, et al., would be impractical and expensive on a commercial scale even if it were remotely feasible to perform. Attwood, et al. [British Polymer Journal, 4, 391 (1972)] also showed that polysulfones are cleaved at the ether linkage by fluoride ion, i.e., addition of potassium fluoride to a polysulfone resulted in re-equilibration to a lower molecular weight. With excess difluorophenyl sulfone also present, extensive depolymerization took place.

Poly(aryl ether ketones) also undergo molecular weight reduction in the presence of, for example, potassium fluoride and end-capping reagent.

THE INVENTION

In the present invention, an effective method has been found to prevent molecular weight degradation in the preparation of poly(aryl ether ketones) by nucleophilic displacement polycondensation reactions. This method comprises the addition of an effective amount of an alkali, alkaline earth, or lanthanide metal salt to the polycondensation reaction to control the molecular weight of the poly(aryl ether ketone).

It is theorized that certain ions, particularly potassium fluoride, cleave the polymer, a reaction which is thought to be the reverse of the nucleophilic displacement polycondensation. The polymerization reaches an equilibrium as illustrated by the following:

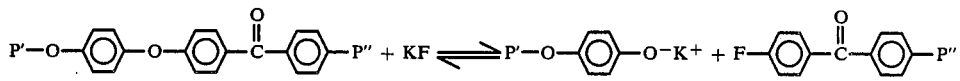

(where P' and P" indicate the polymer chain) However, in the presence of an end capping agent, e.g., RX, the phenate end group can react with RX instead of reforming polymer,

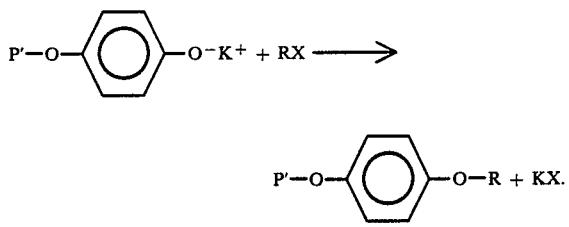

Thus, when RX is present in excess, the polymer will continue to equilibrate (via potassium: fluoride) until all of the RX is consumed and the new equilibrium is reached at lower molecular weight. This is applicant's theory and applicant does not wish to be bound thereby.

The alkali, alkaline earth, or lanthanide metal salts suitable for use in this invention may be characterized by the following formula:

MX wherein M is sodium, lithium, an alkaline earth, or a lanthanide metal, and X is a non-oxidizing anion. It is well known in the art that certain anions such as nitrate and perchlorate can act as oxidizing agents under certain conditions and especially at elevated temperatures. However, such anions would cause side reactions which would be detrimental to the poly(aryl ether ketones). For the purposes of this invention, non oxidizing anions are those which do not react with the poly(aryl ether ketone) or cause reactions deleterious to the polymer structure or properties when employed under the reaction conditions specified herein. Non-oxidizing anions include chloride, bromide, or iodide, sulfate, borate, carbonate, bicarbonate, phosphate, cyanide, or alkyl or aryl carboxylates, such as acetate, oxalate, and benzoate, and the like. The preferred salts include one or more of LiCl, LiBr, $Li_2SO_4$, $Li_2CO_3$, NaBr, NaI, $MgCl_2$, $MgSO_4$, $CaCl_2$, $CaSO_4$, $CaHPO_4$, $SrCl_2$, $BaCl_2$, $LaCl_3$, and the like.

The use of the alkali, alkaline earth, or lanthanide metal salt is applicable to nucleophilic displacement polymerizations of poly(aryl ether ketones) in any form when potassium, rubidium, or cesium and fluoride ions are present in the reaction. The sources of these ions are immaterial and may arise by the use of other salts (i.e., potassium carbonate), monomers which produce the ions by reaction (e.g., difluorobenzophenone), addition of potassium, rubidium or cesium fluoride itself, or in situ generation, as, for example, in the process described in U.S. Pat. No. 4,320,224 wherein fluoro monomers are reacted in the presence of a higher alkali metal carbonate or bicarbonate such as potassium carbonate.

For the purposes of slowing or stopping advancement of molecular weight, addition of the alkali, alkaline earth, or lanthanide metal salt as a solid, slurry, or solution in an appropriate solvent is accomplished just prior to or at the desired molecular weight. The amount of alkali, alkaline earth, or lanthanide metal salt is from about 0.05 to about 10.0 equivalents or more based on the amount of potassium, rubidium or cesium present in aggregate, and preferably is from about 1.0 to about 2.0 equivalents.

If the molecular weight is too high, end capping agent is added which allows cleavage of the polymer to occur and then the alkali, alkaline earth, or lanthanide metal salt is added when the desired molecular weight is attained to stop further degradation of the polymer.

For termination with an end-capping reagent, the alkali, alkaline earth, or lanthanide metal salt and reagent may be added together or the alkali, alkaline, earth or lanthanide metal salt can be added prior to or after the addition of the capping reagent. The amount of alkali, alkaline earth, or lanthanide metal salt is from about 1.0 to about 10 equivalents based on the amount of potassium, rubidium, or cesium present in aggregate, and preferably is from about 1.1 to about 2.0 equivalents. The amount of end-capping agent is preferably at least a stoichiometric equivalent or an excess based on the number of phenate end groups present. Generally, the effective amount of end-capping agent may be estimated, based on the total moles of bisphenol and/or halophenol used in the polycondensation reaction, to be from about 0.001 to about 0.5 moles or more, preferably from about 0.01 to about 0.25 moles, per mole of phenol groups charged.

An advantage of the instant invention is that excess end-capping agent may be used with little or no molecular weight degradation. However, large excess, especially of nonvolatile agents, may be recognized to one skilled in the art as undesirable since unreacted end-capping agent can complicate the isolation and purification of the polymer.

The end-capping agent is preferably an alkyl halide such as methyl chloride or a mono or difunctional aryl halide or nitro compound, such as 4-fluorobenzophenone, dichlorodiphenylsulfone, a monochlorodiphenylsulfone, difluorodiketone, and the like, or a halogen terminated aromatic oligomer.

The poly(aryl ethers) are preferably poly(aryl ether ketones). They may be characterized more specifically by one or more of the following formulae:

(I)

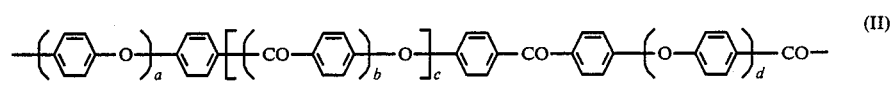

(II)

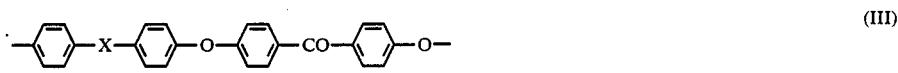

(III)

(IV)

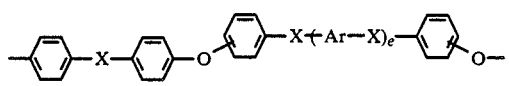
(V)
wherein Ar is independently a divalent aromatic radical selected from phenylene, biphenylene, or naphthalene, X is independently O,
$SO_2$, or a direct bond and a is an integer of from 1 to 4, b, c, d and e are 0 to 1 and preferably d is 0 when b is 1.
Preferred poly(aryl ether ketones) include those having repeating units of the formula:
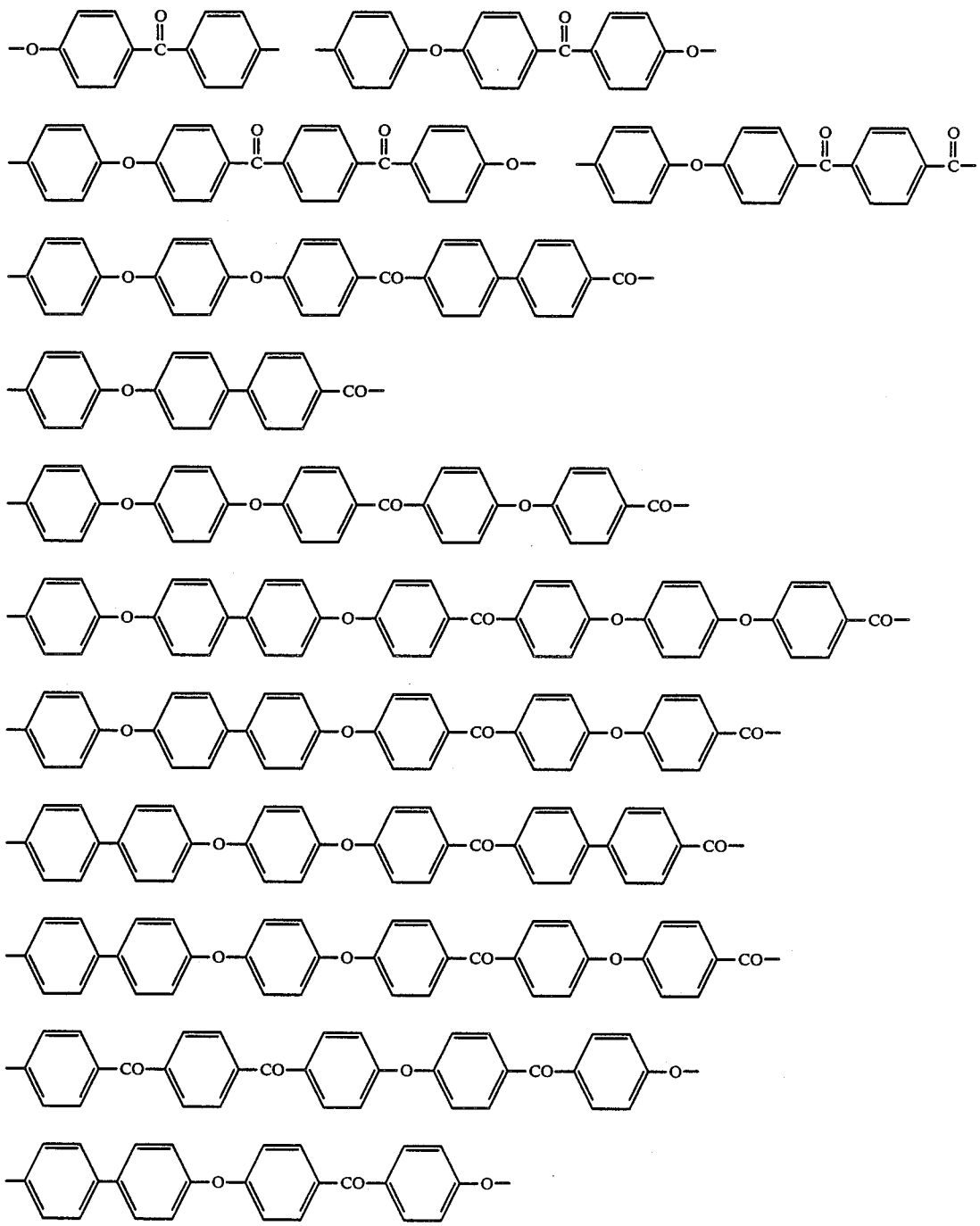

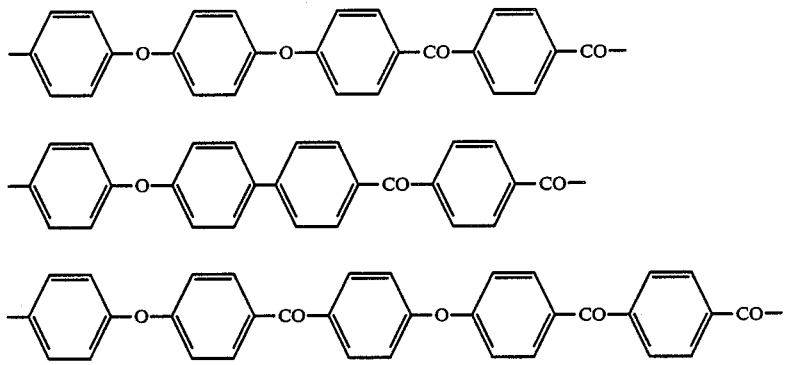

and copolymers thereof.

The process for preparing the poly(aryl ether ketones) comprises reacting a mixture (substantially equimolar amounts when maximum molecular weight is sought) of at least one bisphenol and at least one dihalobenzenoid compound or a halophenol. The bisphenols may be depicted as follows:

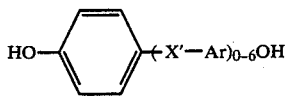

wherein X and X' are independently is O,

$SO_2$, or a direct bond and Ar is independently a divalent radical selected from phenylene, biphenylene or naphthalene, most preferably 1,4-phenylene.

The dihalobenzenoid compound may be depicted as follows:

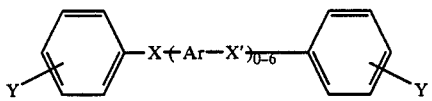

wherein Y is halogen, preferably fluorine or chlorine, or nitro, the Y's may be the same or different and are ortho or para to the X; Ar, X, and X' are as defined above with the proviso that X or X' ortho or para to the Y's are electron withdrawing groups, i.e.,

or $SO_2$. In the preferred embodiment, each aromatic radical is para substituted and most preferably, 1,4-phenylene.

The halophenols may be depicted as follows:

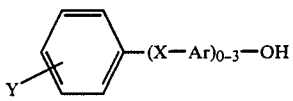

wherein Y, X, and Ar are as defined above with the proviso that the X ortho or para to Y is an electron withdrawing group, i.e.,

or $SO_2$.

Preferred bisphenols is in such a process include:
hydroquinone,
4,4'-dihydroxybenzophenone,
4,4'-dihydroxybiphenyl,
4,4'-dihydroxydiphenyl ether,
4,4'-dihydroxydiphenyl sulfone, and
4,4'-bis(4-hydroxyphenylsulfonyl)biphenyl.

Preferred dihalobenzenoid and halophenol compounds include:
4,4'-dichlorodiphenyl sulfone,
4,4'-difluorodiphenyl sulfone,
4-(4-chlorobenzoyl)phenol,
4-(4-fluorobenzoyl)phenol,
4,4'-difluorobenzophenone,
4,4'-dichlorobenzophenone,
4-chloro-4'-fluorobenzophenone,
1,4-bis(4-fluorobenzoyl)benzene,
4,4'-difluorodiphenyl sulfone, and
1,3-bis(4-fluorobenzoyl)benzene.

The reaction is carried out by heating a mixture of one or more bisphenols and one or more dihalobenzenoid compounds or halophenols at a temperature of from about 100° to about 400° C. The reaction is conducted in the presence of added sodium carbonate and/or bicarbonate and potassium rubidium or cesium fluorides or chlorides or in the presence of sodium carbonate and/or bicarbonate and a higher alkali metal carbonate or bicarbonate. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures ($\overline{1}$250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium fluoride or chloride employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from alkali metal halide) is used for each phenol group.

The sodium and/or potassium carbonate and/or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, it has been observed that the chloride salts are less active than the fluoride salts so that more chloride and less fluoride is used.

Where a bisphenol and dihalobenzenoid compound are employed, they should be used in substantially equimolar amounts when maximum molecular weight is sought. However an excess of bisphenol or dihalide may be employed if desired. An excess of one monomer over the other leads to the production of low molecular weight products which can be desirable when the process is directed to making lower molecular weight PAEK, for example, for block polymer formation.

The reaction may be carried out in the presence of an inert solvent, or partially in the absence of a solvent.

Preferably a solvent is employed and is an aliphatic or aromatic sulphoxide or sulphone of the formula

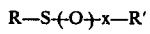

where x is 1 or 2 and R and R' are alkyl or aryl groups and may be the same or different. R and R' may together form a divalent radical. Preferred solvents include dimethyl sulphoxide, dimethyl sulphone, sulpholane (1,1-dioxothiolan), or aromatic sulphones of the formula.

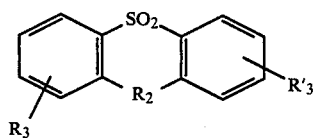

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulphones include diphenylsulphone, ditolyl sulphone, tolylphenyl sulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl 2-pyrrolidinone, N,N-dimethylacetamide, and N-cyclohexyl pyrrolidinone. In another embodiment the reaction is started in a relatively low boiling polar aprotic solvent such as dimethyl formamide, dimethylacetamide, dimethyl sulfoxide, N-methylpyrrolidinone, and the like. Heating at reflux results in the formation of low molecular weight product with attendant precipitation. The solvent may be removed and the low molecular weight product may be advanced if desired by solid state polymerization, i.e. by heating to a temperature in the range of from about 200° to about 400° C.; preferably, an inert atmosphere is maintained during this latter step.

The reaction temperature is in the range of from about 100° to about 400° C. and will depend on the nature of the reactants and the solvent, if any, employed. The preferred temperature is above 250° C. The reactions are preferably carried out at ambient pressure. However, higher or lower pressure can also be used. The reaction is generally carried out in an inert atmosphere.

For the production of some poly(aryl ether ketone)s, it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

Upon reaching or exceeding the desired molecular weight, the alkali, alkaline earth, or lanthanide metal salt and end-capping agent are added as specified above. The reaction temperature is maintained at or near the temperature prior to the addition. A lower temperature may be desirable but should not be so low as to cause precipitation of the polymer from the reaction solution. The reaction mixture is held at said temperature for from a few minutes to as long as several hours.

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, and/or (ii) at least one halophenol, in which in the dihalobenzenoid compound or halophenol, the halogen atoms are activated by —CO groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

The poly(aryl ether ketone)s exhibit a reduced viscosity of from about 0.05 to about 5.0, and preferably, from about 0.1 to about 2.0 dl/g as measured in concentrated sulfuric acid (1 g/100 ml) at 25° C.

The poly(aryl ether ketone)s of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The poly(aryl ether ketones) of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

EXAMPLE 1

A 500 ml 4-neck flask fitted with a mechanical stainless steel stirrer, thermocouple probe, Dean-Stark trap, condenser, nitrogen inlet tube, and bubbler was charged with a poly(aryl ether ketone) having repeating units of the following formula:

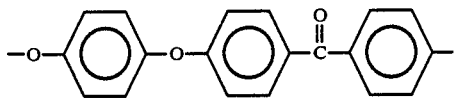

having a reduced viscosity of 1.11 dl/gm as measured in concentrated sulfuric acid (1 gm/100 ml) at 25° C. (66.31 gm, 0.23 mole repeat units), sodium fluoride (19.32 gm, 0.46 mole), potassium fluoride (0.85 gm, 0.0147 mole, ground, dried), lithium chloride (1.27 gm, 0.03 mole, dried), and 200 gm diphenyl sulfone. The flask was evacuated and filled with argon five times by means of a Firestone valve and then ultra-high purity nitrogen flow was begun (bubbler replaced connection to Firestone value). The flask contents was heated using a mantle and temperature controller to melt the diphenyl sulfone and then heated to 300° C. with stirring to dissolve the polymer. After 30 minutes, a 10-15 gm sample of the reaction mixture was taken by means of a glass tube and gentle suction and 1,4-bis(4-fluorobenzoyl) benzene (2.96 gm, 0.0092 mole) was added followed by 10 gm of diphenyl sulfone. The temperature was maintained at 300° C. Reaction mixture samples were taken over the subsequent 3-hour period.

The samples were ground, refluxed twice with acetone, once with 2% aqueous hydrochloric acid, then with water, and washed with acetone and dried. The reduced viscosities (1 gm/100 ml solution in concentrated sulfuric acid, 25° C.) are shown in the Table.

EXAMPLE 2

The reaction of Example 1 was repeated except using magnesium chloride (1.46 gm, 0.015 mole, anhydrous, 98%) was used in place of lithium chloride. The results are shown in the Table.

COMPARATIVE EXAMPLE A

Example 1 was repeated except without the lithium chloride i.e., with potassium fluoride and sodium fluoride. The results (see the Table) show a decrease in reduced viscosity with time, whereas in Examples 1 and 2 essentially no significant change in reduced viscosity was observed.

COMPARATIVE EXAMPLE B

The reaction was conducted essentially as in Example A but in the absence of potassium fluoride, i.e., with the poly(aryl ether ketone), depicted above, sodium fluoride, (21.78 gm, 0.5186 mole) and 1,4-bis(4-fluorobenzoyl) benzene (1.48 gm, 0.0046 mole). The reaction samples (see the Table) showed essentially no change in reduced viscosity.

COMPARATIVE EXAMPLE C

The reaction was conducted essentially as in Example A except without the 1,4-bis(4-fluorobenzoyl)benzene. Thus, the poly(aryl ether ketone) depicted above, sodium fluoride and potassium fluoride were heated in diphenyl sulfone at 300° C. The reduced viscosity of the reaction samples are shown in the Table. The reduced viscosities indicate that in the absence of capping agent, the molecular weight of the polymer increased to some degree.

EXAMPLE 3

The reaction of Example 1 was repeated except using sodium bromide (3.09 gm, 0.030 mole) in place of lithium chloride and omitting the sodium fluoride. The initial reduced viscosity of a sample taken at 300° C. was 1.05 dl/gm. After 40 and 120 minutes at 300° C. the reduced viscosities were 1.09 and 1.08 dl/gm, respectively, which indicated little or no molecular weight degradation.

TABLE

REDUCED VISCOSITIES FOR POLY(ARYL ETHER KETONE) WITH NaF/KF/DIFLUORO-DIKETONE AT 300° C. IN DIPHENYLSULFONE

| MX: | | Example 1 LiCl | Example 2 MgCl$_2$ | Example A None | Example B None* | Example C None** |
|---|---|---|---|---|---|---|
| RV at | 0 | 1.05 | 1.07 | 1.09 | 1.11 | 1.07 |
| Time: | 20 | 1.07 | 1.02 | 1.03 | NM | 1.13 |
| (min) | 40 | 1.06 | 1.04 | 0.95 | 1.11 | 1.17 |
| | 60 | 1.09 | 1.09 | 0.91 | 1.11 | 1.21 |
| | 90 | 1.08 | 1.07 | 0.85 | 1.10 | 1.21 |
| | 120 | 1.05 | 1.09 | 0.82 | 1.10 | |
| | 180 | 1.11 | 1.06 | 0.75 | NM | |

*Without KF
**Without Difluorodiketone
NM = not measured

COMPARATIVE EXAMPLE D

The reaction of Example 3 was repeated except sodium sulfate 4.26 gm, 0.03 mole, anhydrous, ground) was used in place of sodium bromide. The reduced viscosities of samples taken at 0, 40, and 120 minutes at 300° C. were 1.10, 0.99, and 0.87 dl/gm, respectively.

Compared to Examples 1, 2, and 3, some molecular weight degradation occurred but less than found in Example A.

EXAMPLE 4

A 500 ml, 3-neck flask (slanted side necks) fitted with a mechanical stainless steel stirrer, thermocouple probe, Claisen arm, nitrogen inlet tube, condenser, and heating mantle was charged with 4,4-difluorobenzophenone (48.18 gm, 0.2208 mole), hydroquinone (25.33 gm, 0.23 mole), sodium carbonate (24.38 gm, 0.23 mole, ground, dried, 99.6% assy), potassium fluoride (3.4 gm, 0.0586 mole, ground, dried) and 200 gm diphenyl sulfone. The apparatus was connected by means of an adapter on the top of the condenser to a Firestone valve and evacuated and filled with argon five times. A flow of ultra-high purity nitrogen by means of the inlet tube was begun and the Firestone valve replaced with a bubbler. The flask contents was melted, stirring begun, and heated to 200° (temperature controller) and held 30 minutes. The reaction was then heated at 250° C. for 1 hour and then at 290° for 2 hours. 1,4-Bis(4-fluorobenzoyl)benzene (2.96 gm, 0.0092 mole) and 10 gm diphenylsulfone were then added to the reaction flask and the contents heated at 290° C. for 30 minutes and then at 320° for 1 hour to give a viscous reaction mixture. Lithium chloride (2.71 gm, 0.064 mole) and 5 gm diphenyl sulfone were added, and after 8 minutes (temperature 309° C.) a 10–15 gm reaction sample was taken. After a total of 24 minutes after addition of the lithium chloride (temperature 309°–314° C.) another reaction sample was taken. 1,4-bis(4-fluorobenzoyl)benzene (1.48 gm, 0.0046 mole) was added to terminate the polymer along with 5 gm diphenyl sulfone and the reaction was maintained at 300°–305° C. for 1 hour.

The reaction mixture was removed from the flask, cooled, ground, and refluxed successively 1 hour with 600–700 ml of the following: acetone (twice), 2% aqueous hydrochloric acid, water and acetone. The polymer was washed with acetone and dried in a vacuum oven overnight at 110°–120° C. The reaction samples were treated similarly using acetone (twice, 30 min.), 2% aqueous hydrochloric acid, water, and rinsed with acetone before drying.

Reduced viscosity (1 gm/100 ml solution in conc. sulfuric acid, 25° C.) of the polymer from the first reaction sample after lithium chloride addition was 1.06 dl/gm. The reduced viscosity of the polymer before addition of end capping agent was 1.13. The reduced viscosity of the final polymer 1 hour after addition of end capping reagent was 1.04.

The thermal stability of the polymer was excellent. The melt flow at 400° C. (1P) after 10 minutes was 8.56 dl/min and after 30 minutes was 8.26 dg/min (melt flow ratio=0.97).

The polymer was compression molded into a 20 mil plaque and tested for tensile strength and modulus according to ASTM D-638, elongation at break according to ASTM D-638 and pendulum impact strength according to ASTM D-256. The results are as follows:

| Tensile Modulus | 371,000 psi |
| Tensile Strength | 13,900 psi |
| Yield Elongation | 7.5% |
| Elongation at Break | 14–22% |
| Pendulum Impact | 55.5 ft-lb/in$^3$ |

COMPARATIVE EXAMPLE E

The polymerization was conducted essentially as in Example 4 except without addition of lithium chloride prior to end-capping. After reaching the final polymerization temperature at 320° C., a reaction sample was taken after 30 minutes and again after 1 hour and 35 minutes (total polymerization time at 320° C.). 1,4-Bis (4-fluorobenzoyl)benzene (1.48 gm, 0.0046 mole) and 5 gm diphenyl sulfone was added to end cap the polymer. After 1 hour at 300° C., the reaction mixture was removed and cooled.

The reduced viscosity of the first reaction sample was 1.01 dl/gm. The reduced viscosity of the polymer before addition of end-capping reagent was 1.37 dl/gm. After 1 hour with end capping reagent reduced viscosity of the final polymer dropped to 0.98 dl/gm.

The melt flow of the polymer (400°, 1P) was 15.90 after 10 minutes and 15.10 after 30 minutes (melt flow ratio of 0.95).

This example demonstrates that reaction with capping agent in the absence of the lithium chloride used in Example 4 results in a marked degradation in molecular weight of the polymer.

EXAMPLE 5

The polymerization was conducted essentially as in Example 4 using a greater proportion of lithium chloride. Thus, after polymerization at 320° for 1.3 hour, a reaction sample was taken and lithium chloride (4.97 gm, 0.1172 mole) and 5 gm of diphenyl sulfone were added. After 30 minutes, a second reaction sample was removed and 1,4-bis(4-fluorobenzoyl) benzene was added to end-cap the polymer and the reaction held at 300° for 1 hour as in Example 4.

The first reaction sample gave a polymer having a reduced viscosity of 1.15 dl/gm. The second sample, after addition of lithium chloride, gave a reduced viscosity of 1.17 dl/gm. The final polymer had a reduced viscosity of 1.17 dl/gm, which indicates essentially no degradation of molecular weight during end-capping.

The melt flow (400°, 1P) after 10 minutes was 2.24 dg/min and after 30 minutes was 2.40 dg/min (melt flow ratio was 1.07).

The polymer was compression molded into a 20 mil plaque and tested as described in Example 4. The results are as follows:

| Tensile Modulus | 353,000 psi |
| Tensile Strength | 13,800 psi |
| Yield Elongation | 8.0% |
| Elongation at Break | 14.7% |
| Pendulum Impact | 62.7 ft-lb/in$^3$ |

EXAMPLE 6

The polymerization was conducted essentially as in Example 5 using magnesium chloride in place of lithium chloride. The reduced viscosity of the polymer before addition of magnesium chloride (reaction time 1.5 hours at 320° C.) was 1.78 dl/gm. After 30 minutes at 310° C. after addition of magnesium chloride (8.49 gm, 0.0366 mole, Aldrich, 98%), the reduced viscosity of the polymer was 1.79 dl/gm. The reduced viscosity of the final polymer after 1 hour at 300° with 1,4-bis (4-fluorobenzoyl)benzene capping reagent (1.48 gm, 0.0046 mole) was 1.74 dl/gm.

Even at this very high molecular weight at which even a relatively small extent of chain cleavage would result in a noticeable decrease in reduced viscosity, essentially no change in reduced viscosity was observed.

The melt stability of this high molecular weight polymer was excellent. Melt flow (400°, 10P) after 10 minutes was 0.63 dg/min and after 30 minutes was 0.56 dg/min (melt flow ratio 0.89).

COMPARATIVE EXAMPLE F

The polymerization was conducted essentially as in Example 5 with sodium chloride in place of lithium chloride. The reduced viscosity cf the polymer before addition of sodium chloride (1 hour at 320°) was 1.42 dl/gm. Sodium chloride (6.85 gm, 0.1172 mole, dried, ground) was added, the reduced viscosity of the polymer was 1.57 dl/gm after 30 minutes. 1,4-bis(4-fluorobenzoyl)benzene (1.48 gm, 0.0046 mol) was added and the reaction mass held 1 hour at 300° C. The reduced viscosity cf the final polymer was 1.12 dl/gm.

The melt flow of the polymer (400° C., 1P) was 5.77 dg/min after 10 minutes and 4.43 dg/min after 30 minutes; the melt flow ratio was 0.77.

This example shows that sodium chloride did not prevent further molecular weight advance and, upon addition of the end capping reagent, a significant decrease in molecular weight occurred. The melt stability of the polymer of this example was deficient compared to those prepared by the process of this invention.

EXAMPLE 7

The polymerization was conducted essentially as in Example 5 except that end-capping agent was not employed. Thus, after 1.5 hours at 320° C., a reaction sample showed a polymer of reduced viscosity of 1.11 dl/gm. Lithium chloride (4.97 gm, 0.1172 mole) and 5 gm diphenyl sulfone were added. After 30 minutes at 310° C., the reduced viscosity of the polymer was 1.06 dl/gm. After a total time of about 1.5 hours at 300°–310° C., the final polymer had a reduced viscosity of 1.14 dl/gm.

This example shows that addition of lithium chloride effectively suppressed continued polymerization (reduced viscosity increase) and gave little or no molecular weight degradation.

The melt stability of this polymer was excellent. The melt flow (400° C., lP) after 10 minutes was 3.00 dg/min after 30 minutes was 3.16 dg/min; melt flow ratio was 1.05.

COMPARATIVE EXAMPLE G

The polymerization was conducted essentially as in Example 4, except without addition of lithium chloride and without end capping. Thus, after 2 hours and 10 minutes at 320° C., the polymer was removed from the flask, cooled, ground, and washed as in Example 4. The reduced viscosity of the polymer was 1.31 dl/gm.

The melt stability of this high molecular weight polymer was deficient, exhibiting a melt flow ratio (400° C.) of only 0.78.

EXAMPLE 8

The polymerization was conducted essentially as in Example 5 with 4,4-dichlorodiphenyl sulfone as the end capping agent. The reduced viscosity of the polymer before addition of lithium chloride was 1.21 dl/gm. The lithium chloride was added and after 15 minutes a second sample was taken. It had a reduced viscosity of 1.18 dl/gm. The dichlorodiphenyl sulfone (0.0092 moles, 2.64 gm) was added and the reaction mass was held at 300° C. for an additional 43 minutes. The reduced viscosity of the final polymer was 1.22 dl/gm.

The melt flow (400° C., 1P) of the polymer after 10 minutes was 0.92 and the melt flow ratio was 1.00.

The polymer was compression molded into a 20 mil plaque and tested as in Example 4. The results are as follows:

| | |
|---|---|
| Tensile Modulus | 311,000 psi |
| Tensile Strength | 12,500 psi |
| Yield Elongation | 7.5% |
| Elongation at break | 15.3% |
| Pendulum Impact | 74.8 ft-lb/in$^3$ |

COMPARATIVE EXAMPLE H

The polymerization was conducted essentially as in Example 8 except without addition of lithium chloride. Thus, after achieving a viscous reaction mass a sample was taken and 4,4'-dichlorodiphenyl sulfone (0.0046 mole, 1.32 gm) was added to terminate the polymer. The reaction was held at 300° for a total of 1 hour during which time a second reaction sample was taken after 30 minutes. The reduced viscosity of the first sample was 1.27 dl/gm, of the second sample 1.16 dl/gm, and of the final polymer 1.02 dl/gm.

The melt flow (400° C., 1P) of the polymer was 5.67 dg/min after 10 minutes; the melt flow ratio was 1.20.

Compared to Example 8 end capping with an even smaller amount of dichlorodiphenyl sulfone and in the absence of lithium chloride resulted in a decrease of 0.25 reduced viscosity units over 1 hcur at 300° C. Also, as compared to Example 4, which exhibited a similar reduced viscosity of 1.04, the melt flow of the final polymer was only 5.67 dg/min compared to 8.56 dg/min for the polymer prepared in Example 4.

COMPARATIVE EXAMPLE I

A polymerization was conducted using the reaction apparatus described in Example 4 wherein the reaction flask was charged with 4,4'-difluorobenzophenone (0.23 mole, 50.19 gm), hydroquinone (0.23 mole, 25.33 gm), sodium carbonate (0.212 mole, 22.47 gm), potassium carbonate (0.018 mole, 2.49 gm) and 200 gm diphenyl sulfone. After evacuation and purging as in Example 4, the reaction mixture was heated to 200° C., held 30 minutes, heated to 250°, held 70 minutes, heated to 290° C., held 30 minutes, and heated to 320° C. After 85 minutes at 320° C. a reaction sample was taken and 1,4-bis(4-fluorobenzoyl)benzene (0.0046 mole, 1.48 gm) was added to end cap the polymer along with 5 gm diphenyl sulfone. The reaction mixture was held at 300° C. for 1.5 hours and reaction samples were taken during this time at 35 minutes and at 60 minutes. The polymer was recovered and extracted as in Example 4.

The reduced viscosities of the reaction samples and of the final polymer were as follows: 1.47 dl/gm for the first sample, 1.18 dl/gm for the second, 1.14 dl/gm for the third, and 1.05 dl/gm for the final polymer.

The melt flow (400° C., 1P) after 10 minutes was 8.28 dg/min; the melt flow ratio was 1.02.

This example illustrates preparation of a polyketone employing a higher alkali metal carbonate essentially as described in U.S. Pat. Nos. 4,176,222 and 4,320,224. This example also illustrates that employing an end-capping agent, in this case 1,4-bis(4-fluorobenzoyl) benzene, resulted in severe degradation of the polymer molecular weight.

EXAMPLE 9

The polymerization was conducted essentially as in Comparative Example I employing the method of this invention. Thus, after the reaction mass had become viscous at 320° C., a sample was taken and then magnesium chloride (0.0364 mole, 3.54 gm) and 1,4-bis(4-fluorobenzoyl) benzene (0.0046 mole, 1.48 gm) were added along with 5 gm of diphenyl sulfone. The reaction mixture was held at 300° for a total of 1.5 hours during which time samples were taken at 30 and 60 minutes.

The reduced viscosities were, as follows 1.38 dl/gm for the first sample, 1.33 dl/gm for the second sample, 1.34 dl/gm for the third sample, and 1.33 dl/gm for the final polymer The melt flow (400° C., 10P) of the polymer after 10 minutes was 19.20 dg/min; the melt flow ratio was 1.06.

This example demonstrates that using the method of this invention results in little or no molecular weight degradation after end-capping as shown in Comparative Example I, and gave a polymer with excellent stability.

What is claimed is:

1. A process for preparing poly(aryl ether ketones) by nucleophilic displacement polymerization in the presence of at least one alkali metal base selected from potassium, rubidium or cesium, and fluoride ions, whih comprises adding to the polymerization an effective amount of at least one metal salt selected from lithium, sodium, alkaline earth or lanthanide chloride, bromide, iodide, sulfate, alkyl or aryl carboxylate, cyanide, borate or phosphate to slow or stop advancement of molecular weight.

2. A process as defined in claim 1 wherein the metal salt is selected from one or more of LiCl, LiBr, Li$_2$SO$_4$, NaBr, NaI, MgCl$_2$, MgSO$_4$, CaCl$_2$, CaSO$_4$, CaHPO$_4$, SrCl$_2$, BaCl$_2$ or LaCl$_3$.

3. A process as defined in claim 2 wherein the metal salt is LiCl.

4. A process as defined in claim 2 wherien the metal salt is MgCl$_2$.

5. A process as defined in claim 2 wherein the metal salt is CaCl$_2$ or CaSO$_4$.

6. A process as defined in claim 13 wherein the end-capping agent is selected from an alkyl halide, a mono or difunctional aryl halide, a nitro compound or a halogen terminated aromatic oligomer.

7. A process as defined in claim 6 wherein the end-capping agent is selected from methyl chloride, 4-fluorobenzophenone, 4,4'-difluorobenzophenone, dichlorodiphenylsulfone, monochlorodiphenylsulfone or difluorodiketone.

8. A process as defined in claim 13 wherein the end-capping agent is added together with the metal salt.

9. A process as defined in claim 13 wherein the end-capping agent is added after the metal salt.

10. A process as defined in claim 13 wherein the end-capping agent is added during the polymerization prior to addition of the metal salt.

11. A process as defined in claim 1 wherein the metal salt is added prior to or at the desired molecular weight.

12. A process as defined in claim 1 wherein the metal salt is used in amounts of from about 0.05 to 10.0 equivalents based on the amount of potassium, rubidium or cesium present in aggregate.

13. A process for preparing poly(aryl ether ketones) by nucleophilic displacement polymerization in the presence of at least one alkali metal base selected from potassium, rubidium or cesium, and fluoride ions, which comprises adding to the polymerization: (a) an effective amount of at least one metal salt selected from lithium, sodium, alkaline earth or lanthanide chloride, bromide, iodide, sulfate, alkyl or aryl carboxylate, cyanide, borate or phosphate to slow or stop advancement of molecular weight, and (b) an end-capping agent.

14. A process as defined in claim 13 wherein the metal salt is used in amounts of from 0.05 to 10.0 equivalents based on the amount of potassium, rubidium or cesium present in aggregate.

* * * * *